(12) United States Patent
Simpson

(10) Patent No.: US 9,181,123 B2
(45) Date of Patent: Nov. 10, 2015

(54) THERMAL IMAGING TO OPTIMIZE FLAME POLISHING

(71) Applicant: Neil G. Simpson, By Eyemouth (GB)

(72) Inventor: Neil G. Simpson, By Eyemouth (GB)

(73) Assignee: Linde Aktiengesellschaft, Munich (DE)

( * ) Notice: Subject to any disclaimer, the term of this patent is extended or adjusted under 35 U.S.C. 154(b) by 94 days.

(21) Appl. No.: 14/075,106

(22) Filed: Nov. 8, 2013

(65) Prior Publication Data

US 2014/0157827 A1 Jun. 12, 2014

Related U.S. Application Data

(60) Provisional application No. 61/734,444, filed on Dec. 7, 2012.

(51) Int. Cl.
*C03B 29/00* (2006.01)

(52) U.S. Cl.
CPC ...................................... *C03B 29/00* (2013.01)

(58) Field of Classification Search
USPC .................................... 65/29.19, 28, 65, 284
IPC ....................................................... C03B 29/00
See application file for complete search history.

(56) References Cited

U.S. PATENT DOCUMENTS

| | | | |
|---|---|---|---|
| 877,729 A | 1/1908 | Owens | |
| 972,168 A | 10/1910 | DeBay | |
| 1,492,975 A | 5/1924 | Fox | |
| 1,555,358 A | 9/1925 | Danner | |
| 1,667,146 A | 4/1928 | Drake | |
| 2,032,009 A | 2/1936 | Gelstharp et al. | |
| 4,081,260 A | 3/1978 | Glikman et al. | |
| 4,171,966 A | 10/1979 | Baron et al. | |
| 4,576,571 A | 3/1986 | Moufflet et al. | |
| 5,364,080 A | 11/1994 | Kraemer | |
| 5,435,162 A | 7/1995 | Caudill et al. | |
| 5,707,412 A | 1/1998 | Franz | |
| 5,843,199 A | 12/1998 | Lysson et al. | |
| 6,045,913 A * | 4/2000 | Castle | 428/403 |
| 6,254,981 B1 * | 7/2001 | Castle | 428/325 |
| 6,877,341 B1 | 4/2005 | Hong | |
| 7,000,429 B2 | 2/2006 | Langsdorf et al. | |
| 2007/0160948 A1 | 7/2007 | Gartz | |
| 2010/0086002 A1 | 4/2010 | Hwang | |
| 2010/0132854 A1 | 6/2010 | Cola, Jr. | |
| 2010/0162761 A1 | 7/2010 | Camey et al. | |
| 2013/0189634 A1 | 7/2013 | Bors | |

FOREIGN PATENT DOCUMENTS

| | | |
|---|---|---|
| DE | 103 54 411 A1 | 6/2005 |
| DE | 10 2009 019 496 A1 | 11/2010 |
| DE | 1020 11120679.9 | 12/2011 |
| EP | 2 090 667 A1 | 8/2009 |
| FR | 2847969 A1 | 6/2004 |
| JP | 11 325421 A | 11/1999 |
| WO | WO 2011/126427 A1 | 10/2011 |

OTHER PUBLICATIONS

European Search Report for EP 12 00 2748 Date of Mailing: Jul. 27, 2012, Authorized Officer: Stefano Peis, 7 pp.
European Search Report for EP 12 00 8168, Date of Mailing: Apr. 5, 2013, Authorized Officer: Stefano Peis, 7 pp.
European Search Report for EP 12 00 2747 Date of Mailing: Oct. 17, 2012, Authorized Officer: Marc Rischard, 6 pp.
European Search Report for EP 12 00 8170 Date of Mailing: Mar. 6, 2013, Authorized Officer: Marc Rischard, 6 pp.

* cited by examiner

*Primary Examiner* — Mark Halpern
(74) *Attorney, Agent, or Firm* — Joshua L. Cohen

(57) ABSTRACT

A process for optimizing flame polishing of a glass product includes subjecting a glass product to heating parameters related to the glass product, first sensing a first thermal image of the glass product, polishing the glass product with a flame, second sensing a second thermal image of the glass product after the polishing of the glass product, and adjusting parameters of the flame polishing as necessary based upon the second sensing of the second thermal image of the glass product.

5 Claims, No Drawings

THERMAL IMAGING TO OPTIMIZE FLAME POLISHING

BACKGROUND

The present embodiments relate to imaging of glass products and glass containers for determining the quality of the glass product for flame polishing.

Glass manufacturers for various products confront increased quality demands for the products, especially in art and tableware, container glass, flacons (eg, high quality bottles for products such as for example perfume) and also in the flat glass segment. In conjunction with the rise in quality demands, glass manufacturers are encouraged to cut production costs and to increase glass production efficiency, such as for example replacing acid polishing and the minimization/elimination of mechanical post-processing during glass surface treatment.

Certain technologies and processes have been produced to provide a higher quality product and productivity efficiencies. Process parameters of the burner technologies, such as flow velocities and heat transfer rates, working distance of the burners, flame shapes, etc., enhance the efficiency of glass surface treatment as well as fire polishing and related processes.

For example, HYDROPOX™ and HYDROPOX-C™ burner systems distributed by Linde Aktiengesellschaft of Germany use increased thermal efficiencies of pre-mixing burner technologies to improve the heat transfer rate due to a higher flow velocity of the burner technologies and a shorter distance of the burners from the product. The heat transfer rates of pre-mixed hydrogen/oxygen flames are approximately two to three times greater than those of pre-mixed natural gas/oxygen flames. Similarly, the heat transfer rates of pre-mixed natural gas/oxygen and hydrogen/oxygen flames are approximately six to eight times greater than the heat transfer rates of post-mixing burners with the same mediums.

However, the use of these technologies are a relatively expensive, and such processes are usually reserved for use with premium glass products. Additionally, due to the significant differences in shape of the products, there is frequently little or no repetition of set-up for these premium products and each run for the products is usually set up manually, which also increases the cost of the process. In certain applications for premium products, the amount of time in the glass leher (i.e., the heat treatment annealing stage) can be as high as 40 to 180 minutes, which results in a large amount of premium product being processed before there is any feedback of quality in the resulting processed product. Glass bottle forming machines typically have more than one mold and in some cases up to 12 sections with each section having from one to four molds for the products to be processed. Therefore, depending upon the position of the mold with respect to other ones of the mold in the machine, the temperature of the glass may be different from the first mold to the very last mold processed. Consequently, if burners are positioned too close to the product and/or operated under excessive fire power, there is a risk that flashbacks will occur and/or the flame arresters being blown out which will stop the flame polishing process, thereby requiring replacement of components, pressure testing and then re-ignition of the melter. This results in a tremendous loss of production time and product loss.

It would therefore be desirable to know the quality of the glass for premium products prior to the run being completed so that the necessary adjustments can be made during the production run, such as in HYDROPOX™ and HYDROPOX-C™ systems.

DETAILED DESCRIPTION OF THE INVENTION

The present embodiments obtain thermal images of glass sheets and/or containers, such as for example specialty glass and tableware, before flame polishing of same so that it is possible to determine a temperature of the containers and relative differences from one mold to the next. This will be the base line temperature that can be stored as a record for subsequent guidance.

By obtaining a thermal image of the flame finished container before entering the flame polishing equipment, the operator will be able to identify areas of temperature non-homogeneity, i.e. hot or cold spots in the container product. In such a situation, the operator will have an opportunity to optimize the flame position and power level of same in order to substantially reduce if not eliminate the non-homogeneity. The present embodiments will significantly increase product yield and reduce down-time due to blown flash-backs in the furnace.

The present embodiments enable an operator of a glass melting process to measure the actual process and thereafter optimize same based upon a thermal image of the process and the glass product being melted. The present embodiments also will permit the operator to improve product yield by receiving feedback about the quality of the glass melt at an earlier phase of the glass melting process than is presently known. Such apparatus and method also provide for more effective and efficient use of the oxidant and fuel for the glass melting process and provide for continuity during successive runs of the glass process with a particular quality of glass product or seed. Because the glass melting process is optimized by the embodiments of the present invention, this will therefore reduce the number of flash back arrestors necessary for use with the glass melting process.

The process of the present embodiments include obtaining and/or providing glass heating parameters for a glass sheet, providing the glass sheet to be treated, treating or subjecting the glass sheet to the heating parameters earlier provided, sensing a thermal image of the glass sheet prior to flame polishing, flame polishing the glass sheet, sensing a thermal image of the glass sheet immediately following the flame polishing to determine over-heating or under-heating, and adjusting if necessary the flame polishing parameters based upon the second sensing step employed. It is also possible to sense the glass heating parameters during the actual flame polishing to adjust heating of the glass sheet immediately as is necessary.

Accordingly, there is provided herein a process for optimizing flame polishing of a glass product, which includes subjecting a glass product to heating parameters related to the glass product; first sensing a first thermal image of the glass product; polishing the glass product with a flame; second sensing a second thermal image of the glass product after the polishing of the glass product; and adjusting parameters of the flame polishing as necessary based upon the second sensing of the second thermal image of the glass product.

The process may also include the polishing comprising third sensing of the glass product concurrent with the polishing for adjusting the heating parameters as necessary during said polishing.

A thermal camera can be used to sense and record the thermal image of the glass sheet before the sheet enters the polishing process and immediately after the process. One or both of the cameras can be used to identify those sheets or products which do not comply with acceptable tolerances, which could indicate possible defects in the product mold.

It will be understood that the embodiments described herein are merely exemplary, and that one skilled in the art may make variations and modifications without departing from the spirit and scope of the invention. All such variations and modifications are intended to be included within the scope of the invention as described and claimed herein. Further, all embodiments disclosed are not necessarily in the alternative, as various embodiments of the invention may be combined to provide the desired result.

What is claimed is:

1. A process for optimizing flame polishing of a glass product, comprising:
    subjecting the glass product to heating parameters related to the glass product;
    first sensing of a first thermal image representing a first temperature of the glass product;
    polishing the glass product with a flame;
    second sensing of a second thermal image representing a second temperature of the glass product after the polishing of the glass product with the flame; and
    adjusting parameters of the flame polishing as necessary based upon the second sensing of the second thermal image of the glass product.

2. The process of claim 1, wherein the polishing comprises third sensing of the glass product concurrent with the polishing for adjusting the heating parameters as necessary during said polishing.

3. The process of claim 2, wherein the third sensing comprises focusing a thermal imaging camera on the glass product.

4. The process of claim 1, wherein the first and second sensing comprises focusing thermal imaging cameras on the glass product.

5. The process of claim 1, wherein the glass product comprises an object selected from the group consisting of a glass sheet, a glass container, tableware, and a flacon.

* * * * *